United States Patent Office 3,445,476
Patented May 20, 1969

3,445,476
PROCESS FOR THE PREPARATION OF
2-(AMINOETHYL)PHTHALIMIDINES
Theodore S. Sulkowski, Narberth, and Albert A. Mascitti,
Norristown, Pa., assignors to American Home Products
Corporation, New York, N.Y., a corporation of
Delaware
No Drawing. Filed Mar. 14, 1967, Ser. No. 622,919
Int. Cl. C07d 27/08, 31/42
U.S. Cl. 260—325                    5 Claims

ABSTRACT OF THE DISCLOSURE

This invention is concerned with a process for the hydrogenolysis of tetrahydroimidazoisoindolones to prepare 2-(2-aminoethyl)phthalimidines which are useful intermediates in the preparation of 2-(2-aminoethyl)isoindolines which are pharmacologically active as anti-depressants and anorexiants.

---

This invention relates to a new and novel process for the preparation of 2-(aminoethyl)phthalimidines which are employed in intermediates in the preparation of the therapeutically efficacious 2-(2-aminoethyl)isoindolines.

The new and novel process for the preparation of these 2-(aminoethyl)phthalimidines is illustrated by the following reaction scheme:

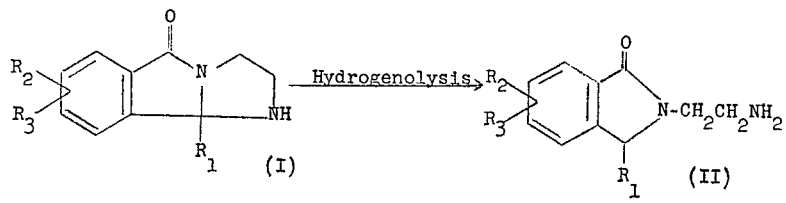

wherein $R_1$ is selected from the group consisting of hydrogen, lower alkyl, phenyl, phen(lower)alkyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, amino, lower alkylamino, halogen, trifluoromethyl, lower alkyl and lower alkoxy; and $R_3$ is hydrogen when $R_2$ and $R_3$ are dissimilar and when $R_2$ and $R_3$ are the same they are both selected from the group consisting of hydrogen, halogen, lower alkyl and lower alkoxy. The hydrogenolysis reaction is effected by contacting a tetrahydroimidazoisoindolone (I) with a palladium charcoal catalyst, in an appropriate solvent, e.g. acetic acid, under a positive hydrogen atmosphere with stirring until the hydrogen uptake ceases. Preferably this reaction is conducted with a 10% palladium on charcoal catalyst in acetic acid under about 45 p.s.i. of hydrogen pressure. By "palladium charcoal catalyst" as employed herein is meant a catalyst consisting of about two percent to about ten percent palladium on charcoal. The term "positive hydrogen atmosphere" is defined to mean a hydrogen atmosphere under a positive pressure of about 15 p.s.i. to about 75 p.s.i.

When the hydrogenolysis reaction is complete, the product (II) is separated by procedures well known in the art, for example, the catalyst is removed by filtration or decantation; the filtrate evaporated to dryness; the residue dissolved in water, basified with a base, e.g. sodium hydroxide, potassium hydroxide, sodium bicarbonate and potassium bicarbonate; extracted with a water-immiscible solvent, for example, ethyl acetate, ether, chloroform, carbon tetrachloride and benzene; and the extract evaporated to dryness to afford a 2-(2-aminoethyl)phthalimidine (II).

The tetrahydroimidazoisoindolone reactants (I) employed in the process of the present invention are known compounds which are described and claimed in co-pending U.S. patent application, Ser. No. 554,672, filed on June 2, 1966, entitled "Benzodiazocines" which is a continuation-in-part of U.S. patent application Ser. No. 444,050, filed on Mar. 30, 1965, and now abandoned.

The 2-(aminoethyl)phthalimidines which are prepared by the new and novel process of the present invention are useful intermediates in the preparation of 2-(2-aminoethyl)isoindolines which have demonstrated pharmacological activity as anti-depressants and anorexiants. These 2-(2-aminoethyl)isoindolines are described and claimed in co-pending U.S. patent application, Ser. No. 622,917, filed on Mar. 14, 1967, entitled "Isoindoles, Isoindolines and Related Compounds."

The following examples are given by way of illustration and are not to be construed as limitations of this invention, variations of which are possible without departing from the scope and spirit thereof.

Example I

A mixture of 25 g. of 9b-phenyl-1,2,3,9b-tetrahydro-5H-imidazo[2,1-a]isoindol-5-one, 5 g. of 10% palladium on charcoal and 200 ml. of acetic acid is shaken with hydrogen at an initial pressure of 43 p.s.i. After the hydrogen uptake ceases (within one hour), the catalyst is separated by filtration and the filtrate is evaporated to dryness. The solid residue is dissolved in water and made basic with sodium hydroxide solution. The mixture is extracted with ethyl acetate. After drying over magnesium sulfate, the ethyl acetate extract is evaporated in vacuo to an oil. After cooling, there is obtained 2-(2-aminoethyl)-3-phenylphthalimidine, M.P. 83° C. The hydrochloride of 2-(2-aminoethyl)-3-phenylphthalimidine is formed by reaction with hydrochloric acid, 260–2° C.

In a similar manner, starting with 9b-(p-chlorophenyl)-1,2,3,9b-tetrahydro-5H-imidazo[2,1-a]isoindol-5-one, there is obtained 2-(2-aminoethyl)-3-(p-chlorophenyl)phthalimidine hydrochloride, M.P. 305° C.

Example II

A mixture of 12.5 g. of 9b-(p-methoxyphenyl)-1,2,3,9b-tetrahydro-5H-imidazo[2,1-a]isoindol-5-one, 5 g. of 5% palladium on charcoal and 100 ml. of acetic acid is shaken with hydrogen at an initial pressure of 75 p.s.i. After the hydrogen uptake ceases, the catalyst is separated by filtration and the filtrate evaporated to dryness. The solid residue is dissolved in water, made basic with potassium hydroxide solution and extracted with chloroform. After drying over magnesium sulfate, the extract is evaporated to afford 2-(2-aminoethyl)-3-(p-methoxyphenyl)phthalimidine.

In a similar manner, 8-amino-9b-phenyl-1,2,9b-tetrahydro-5H-imidazo[2,1-a]isoindol-5-one is converted to 5-amino-2-(2-aminoethyl)-3-phenylphthalimidine.

Example III

The procedure of Examples I and II is repeated on the hereinafter listed tetrahydroimidazoisoindolones to produce the following 2-(2-aminoethyl)phthalimidines:

| Tetrahydroimidazoisoindolones | 2-(2-aminoethyl) phthalimidines |
|---|---|
| 9b-(p-fluorophenyl)-1,2,3,9b-tetrahydro-5H-imidazo[2,1-a]isoindol-5-one. | 2-(2-aminoethyl)-3-(p-fluorophenyl)phthalimidine. |
| 9b-(2-thienyl)-1,2,3,9b-tetrahydro-5H-imidazo[2,1-a]isoindol-5-one. | 2-(2-aminoethyl)-3-(2-thienyl)phthalimidine. |
| 9b-(3-thienyl)-1,2,3,9b-tetrahydro-5H-imidazo[2,1-a]isoindol-5-one. | 2-(2-aminoethyl)-3-(3-thienyl)phthalimidine. |
| 9b-(2-pyridyl)-1,2,3,9b-tetrahydro-5H-imidazo[2,1-a]isoindol-5-one. | 2-(2-aminoethyl)-3-(2-pyridyl)phthalimidine. |
| 9b-(3-furyl)-1,2,3,9b-tetrahydro-5H-imidazo[2,1-a]iso-indol-5-one. | 2-(2-aminoethyl)-3-(3-furyl)phthalimidine. |
| 9b-(m-trifluoromethylphenyl)-1,2,3,9b-tetrahydro-5H-imidazo[2,1-a]isoindol-5-one. | 2-(2-aminoethyl)-3-(m-trifluoromethylphenyl)phthalimidine. |
| 7-methyl-9b-phenyl-1,2,3,9b-tetrahydro-5H-imidazo[2,1-a]isoindol-5-one. | 2-(2-aminoethyl)-6-methyl-3-phenylphthalimidine. |
| 7-methoxy-9b-phenyl-1,2,3,9b-tetrahydro-5H-imidazo[2,1-a]isoindol-5-one. | 2-(2-aminoethyl)-6-methoxy-3-phenylphthalimidine. |
| 9b-phenyl-1,2,3,9b-tetrahydro-7-trifluoromethyl-5H-imidazo[2,1-a]isoindol-5-one. | 2-(2-aminoethyl)-3-phenyl-6-trifluoromethylphthalimidine. |
| 6-chloro-9b-phenyl-1,2,3,9b-tetrahydro-5H-imidazo[2,1-a]isoindol-5-one. | 2-(2-aminoethyl)-7-chloro-3-phenylphthalimidine. |
| 9b-(p-chlorophenyl)-7,8-dimethoxy-1,2,3,9b-tetrahydro-5H-imidazo[2,1-a]isoindol-5-one. | 2-(2-aminoethyl)-3-(p-chlorophenyl)-5,6-dimethoxyphthalimidine. |
| 9b-ethyl-1,2,3,9b-tetrahydro-5H-imidazo[2,1-a]isoindol-5-one. | 2-(2-aminoethyl)-3-ethylphthalimidine. |
| 8-bromo-9b-(p-ethoxyphenyl)-1,2,3,9b-tetrahydro-5H-imidazo[2,1-a]isoindol-5-one. | 2-(2-aminoethyl)-5-bromo-3-(p-ethoxyphenyl)phthalimidine. |
| 7-methyl-9b-(p-tolyl)-1,2,3,9b-tetrahydro-5H-imidazo[2,1-a]isoindol-5-one. | 2-(2-aminoethyl)-6-methyl-3-(p-tolyl)phthalimidine. |
| 7,8-dichloro-9b-phenyl-1,2,3,9b-tetrahydro-5H-imidazo[2,1-a]isoindol-5-one. | 2-(2-aminoethyl)-5,6-dichloro-3-phenylphthalimidine. |
| 7,8-dibromo-9b-(2-thienyl)-1,2,3,9b-tetrahydro-5H-imidazo[2,1-a]isoindol-5-one. | 2-(2-aminoethyl)-5,6-dibromo-3-(2-thienyl)phthalimidine. |
| 9b-phenethyl-1,2,3,9b-tetrahydro-5H-imidazo[2,1-a]isoindul-5-one. | 2-(2-aminoethyl)-3-phenethylphthalimidine. |

Example IV

A mixture of 25 g. of 9b-(2,4-dimethoxyphenyl)-1,2,3,9b - tetrahydro - 5H - imidazo[2,1-a]isoindol-5-one, 25 g. of 2% palladium on charcoal and 200 ml. of acetic acid is shaken with hydrogen at an initial pressure of 15 p.s.i. After the hydrogen uptake is complete, the catalyst is separated by filtration and the filtrate evaporated to dryness. The solid residue is dissolved in water, made basic with sodium bicarbonate solution and the mixture is extracted with benzene. After drying over magnesium sulfate, the extract is evaporated in vacuo to afford 2-(2-aminoethyl)-3-(2,4-dimethoxyphenyl)phthalimidine.

Similarly, 8-methylamino - 1,2,3,9b - tetrahydro - 9b-phenyl-5H-imidazo[2,1-a]isoindol-5-one is subjected to hydrogenolysis to afford 2-(2-aminoethyl)-5-methylamino-3-phenylphthalimidine.

Example V

A mixture of 50 g. of 9b-(3,4-dichlorophenyl)-1,2,3,9b-tetrahydro-5H-imidazo[2,1,-a]isoindol-5-one, 10 g. of 10% palladium on charcoal and 400 ml. of acetic acid is shaken with hydrogen at an initial pressure of 50 p.s.i. After the hydrogen uptake ceases, the catalyst is separated by filtration and the filtrate evaporated to dryness. The solid residue is dissolved in water and made basic with potassium bicarbonate solution. The mixture is extracted with ethyl acetate. After drying over magnesium sulfate, the extract is evaporated in vacuo to afford 2-(2-aminoethyl)-3-(3,4-dichlorophenyl)phthalimidine.

Example VI

A mixture of 25 g. of 9b-(2,4-dibromophenyl)-1,2,3,9b-tetrahydro-5H-imidazo[2,1-a]isoindol-5-one, 5 g. of 10% palladium on charcoal and 200 ml. of acetic acid is shaken with hydrogen at an initial pressure of 50 p.s.i. After the hydrogen uptake ceases (within one hour), the catalyst is separated by filtration and the filtration evaporated to dryness. The solid residue is dissolved in water and made basic with sodium hydroxide solution. The mixture is extracted with chloroform. After drying over magnesium sulfate, the extract is evaporated in vacuo to afford 2-(2-aminoethyl)-3-(2,4-dibromophenyl)phthalimidine.

In a similar manner, 9b-(m-fluorophenyl)-1,2,3,9b-tetrahydro - 5H-imidazo[2,1-a]isoindol - 5 - one; 9b-(p-bromo - phenyl) - 1,2,3,9b-tetrahydro 5H-imidazo[2,1-a]isoindol-5-one; and 9b-(5,6,7,8-tetrahydro-2-naphthyl)-1,2,3,9b-tetrahydro-5H-imidazo[2,1-a]isoindol-5-one are respectively converted to 2-(2-aminoethyl)-3-(m-fluorophenyl)phthalimidine; 2 - (2-amino-ethyl)-3-(p-bromophenyl)phthalimidine; and 2-(2-aminoethyl)-3-(5,6,7,8-tetrahydro-2-naphthyl)phthalimidine.

Example VII

A mixture of 75 g. of 9b-(p-ethylphenyl)-1,2,3,9b-tetrahydro-5H-imidazo[2,1-a]isoindol-5-one, 15 g. of 10% palladium on charcoal and 600 ml. of acetic acid is shaken with hydrogen at an initial pressure of 45 p.s.i. After the hydrogen uptake ceases, the catalyst is separated by filtration and the filtrate evaporated to dryness. The solid residue is dissolved in water and made basic with sodium hydroxide solution. The mixture is extracted with ethyl acetate. After drying over magnesium sulfate, the extract is evaporated in vacuo to afford 2-(2-aminoethyl)-3-(p-ethylphenyl)phthalimidine.

In a similar manner, 1,2,3,9b-tetrahydro-7,8-dimethyl-9b-phenyl-5H-imidazo(2,1-a)isoindol-5-one is converted to 2-(2-aminoethyl)-5,6-dimethyl-3-phenylphthalimidine.

Example VIII

A mixture of 25 g. of 9b-benzyl-1,2,3,9b-tetrahydro-5H-imidazo[2,1-a]isoindol-5-one, 5 g. of 10% palladium on charcoal and 200 ml. of acetic acid is shaken with hydrogen at an initial pressure of 43 p.s.i. After the hydrogen uptake ceases (within one hour), the catalyst is separated by filtration and the filtrate evaporated to dryness. The solid residue is dissolved in water and made basic with sodium hydroxide solution. The mixture is extracted with ethyl acetate. After drying over magnesium sulfate, the extract is evaporated in vacuo and the residue reacted with acetic acid to afford 2-(2-aminoethyl)-3-benzylphthalimidine acetate, M.P. 156–157° C.

What is claimed is:
1. A process for the preparation of compounds having the formula:

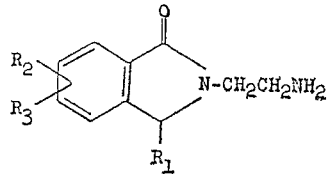

wherein $R_1$ is selected from the group consisting of hydrogen, lower alkyl, phenyl, phen(lower)alkyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, amino, lower alkylamino, halogen, trifluoromethyl, lower alkyl and lower alkoxy; and $R_3$ is hydrogen when $R_2$ and $R_3$ are dissimilar and when $R_2$ and $R_3$ are the same they are both selected from the group consisting of hydrogen, halogen, lower alkyl and lower alkoxy, which comprises contacting a tetrahydro-imidazoisoindolone of the formula:

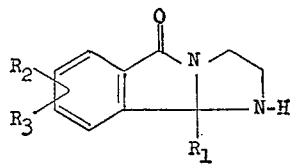

wherein $R_1$, $R_2$ and $R_3$ are defined as above, with a palladium charcoal catalyst, consisting of about two to about ten percent palladium on charcoal, in acetic acid, under a positive hydrogen atmosphere of from about 15 p.s.i. to about 75 p.s.i.

2. A process as described in claim 1 wherein the palladium charcoal catalyst consists of ten percent palladium on charcoal and the positive hydrogen atmosphere is 45 p.s.i.

3. A process as described in claim 1 for the preparation of 2-(2-aminoethyl)-3-phenylphthalimidine which comprises contacting 9b-phenyl-1,2,3,9b-tetrahydro-5H-imidazo-[2,1-a]isoindol-5-one with a ten percent palladium on charcoal catalyst, in acetic acid, under a positive hydrogen atmosphere of 45 p.s.i.

4. A process as described in claim 1 for the preparation of 2-(2-aminoethyl)-3-(p-chlorophenyl)phthalimidine hydrochloride which comprises contacting 9b-(p-chlorophenyl)-1,2,3,9b-tetrahydro-5H-imidazo[2,1-a]isoindol-5-one with a ten percent palladium on charcoal catalyst, in acetic acid, under a positive hydrogen atmosphere of 45 p.s.i.

5. A process as described in claim 1 for the preparation of 2-(2-aminoethyl)-3-benzylphthalimidine acetate which comprises contacting 9b-benzyl-1,2,3,9b-tetrahydro-5H-imidazo[2,1-a]isoindol-5-one with a ten percent palladium on charcoal catalyst, in acetic acid, under a positive hydrogen atmosphere of 45 p.s.i.

References Cited

UNITED STATES PATENTS 3,334,113   8/1967   Houlihan _____ 260—325 XR

ALEX MAZEL, *Primary Examiner.*

J. A. NARCAVAGE, *Assistant Examiner.*

U.S. Cl. X.R.

260—296, 309.7, 999